(12) United States Patent
Heskett

(10) Patent No.: US 12,410,960 B2
(45) Date of Patent: Sep. 9, 2025

(54) DEVICE AND METHODS FOR FREEZING LIQUIDS INTO A FLAT FORM

(71) Applicant: MH Product Development, LLC, Scottsdale, AZ (US)

(72) Inventor: Tyson Heskett, Scottsdale, AZ (US)

(73) Assignee: MH Product Development, LLC, Scottsdale, AZ (US)

( * ) Notice: Subject to any disclaimer, the term of this patent is extended or adjusted under 35 U.S.C. 154(b) by 186 days.

(21) Appl. No.: 18/317,321

(22) Filed: May 15, 2023

(65) Prior Publication Data
US 2024/0384911 A1 Nov. 21, 2024

(51) Int. Cl.
*F25C 1/12* (2006.01)

(52) U.S. Cl.
CPC ...................... *F25C 1/12* (2013.01)

(58) Field of Classification Search
CPC .......... F25C 1/22; F25C 1/12; F25D 2331/801–2331/8015; A61M 1/0277; A61J 1/165; A23B 11/1455; A23B 2/8033; A23B 2/8055; A23B 4/068
See application file for complete search history.

(56) References Cited

U.S. PATENT DOCUMENTS

| | | | |
|---|---|---|---|
| 4,194,369 A * | 3/1980 | Faust | F25D 3/10 62/530 |
| 5,620,133 A | 4/1997 | Isserstedt | |
| 8,146,762 B2 | 4/2012 | Leoncavallo et al. | |
| 9,279,610 B2 | 3/2016 | Wang et al. | |
| 11,614,273 B2 | 3/2023 | Rothe | |
| 2006/0148646 A1 | 7/2006 | Pursell et al. | |
| 2015/0305324 A1* | 10/2015 | Ilyin | A01N 1/122 435/2 |
| 2016/0324283 A1 | 11/2016 | Kane | |

FOREIGN PATENT DOCUMENTS

CN 201431140 3/2010

* cited by examiner

*Primary Examiner* — Cassey D Bauer
(74) *Attorney, Agent, or Firm* — Brian M. Kaufman; Robert D. Atkins; PATENT LAW GROUP: Atkins and Associates, P.C.

(57) ABSTRACT

A device for freezing liquid in a flat form has a first plate with a first portion of a latching mechanism and a second plate including a second portion of the latching mechanism. The latching mechanism includes a spring pin, a post and grommet, or a clip in various embodiments. The first plate and second plate can include a plurality of symmetrically formed tabs extending outward from the plates with the latching mechanism formed on the tabs. The first plate and second plate may include a plurality of symmetrically formed latching mechanisms.

20 Claims, 16 Drawing Sheets

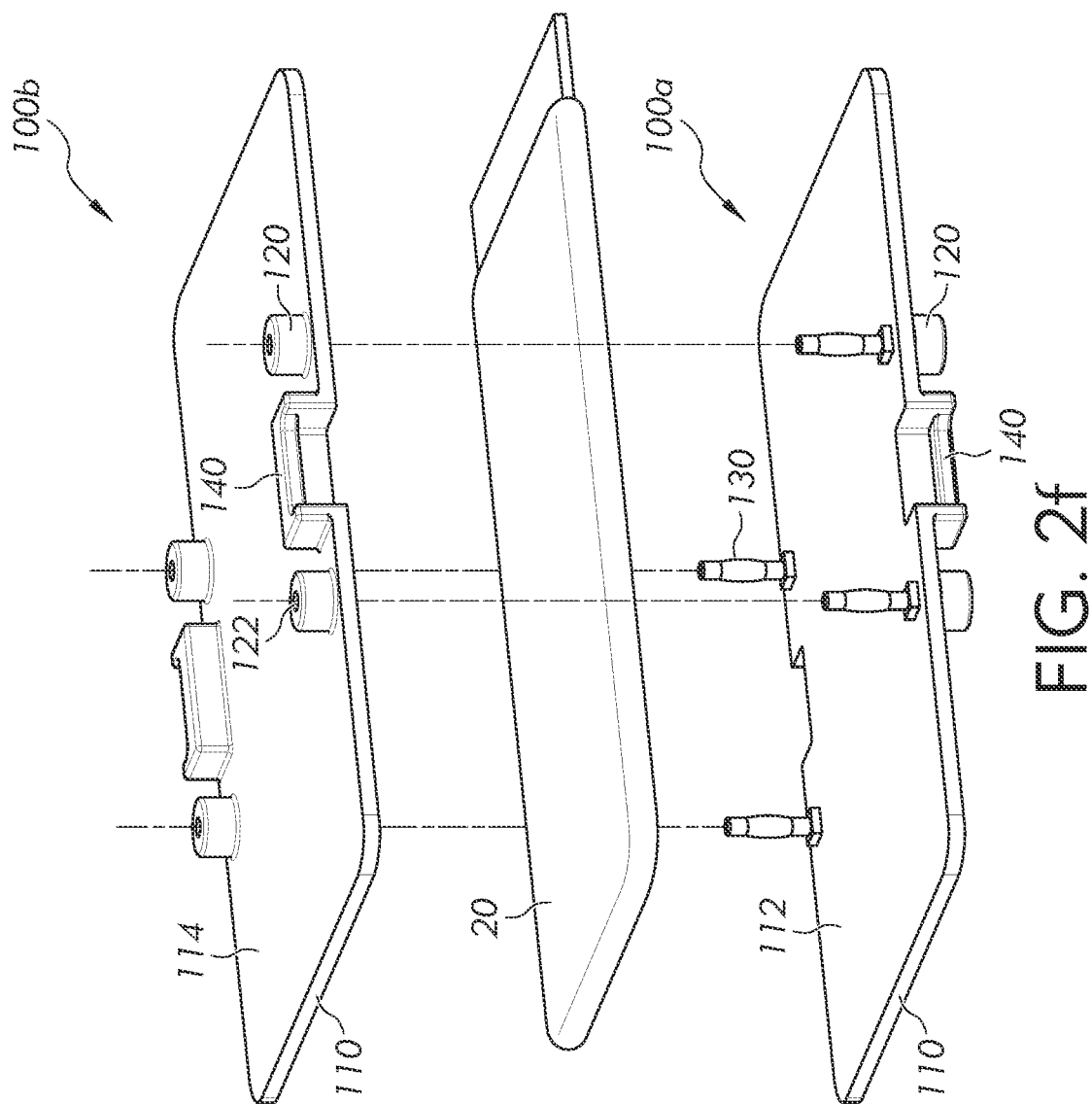

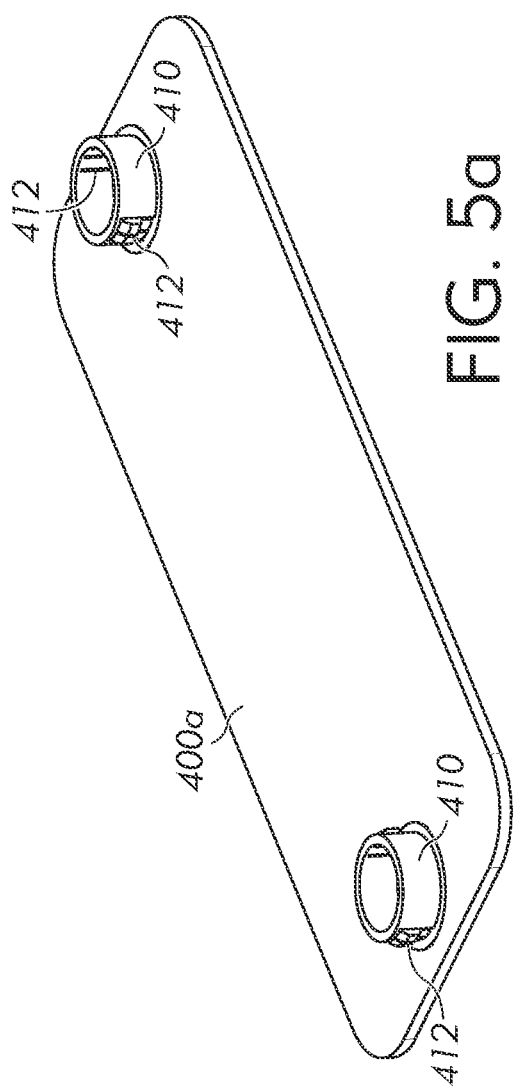
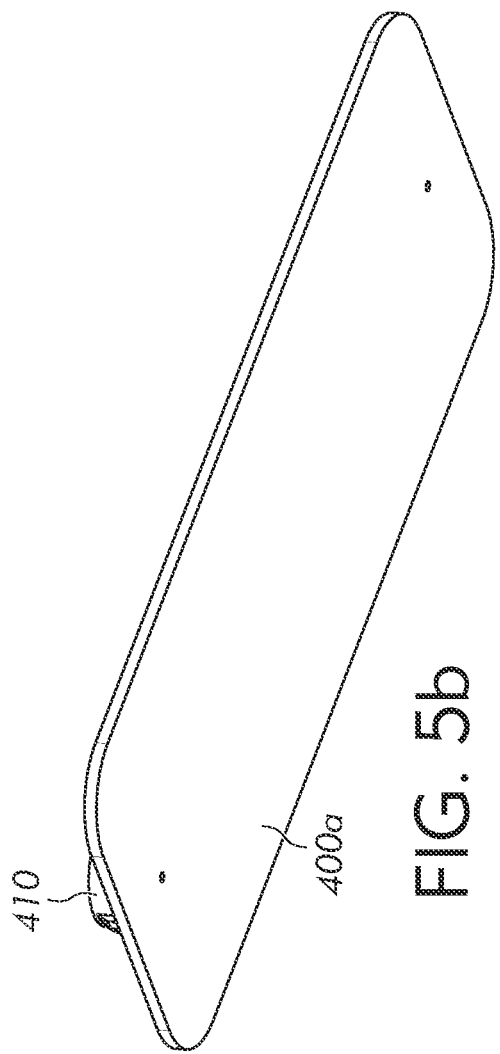

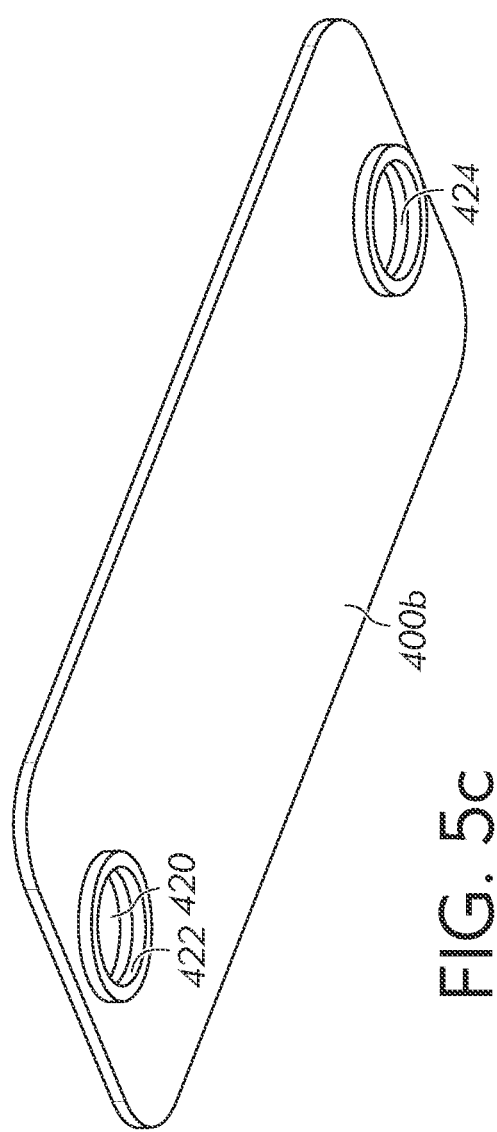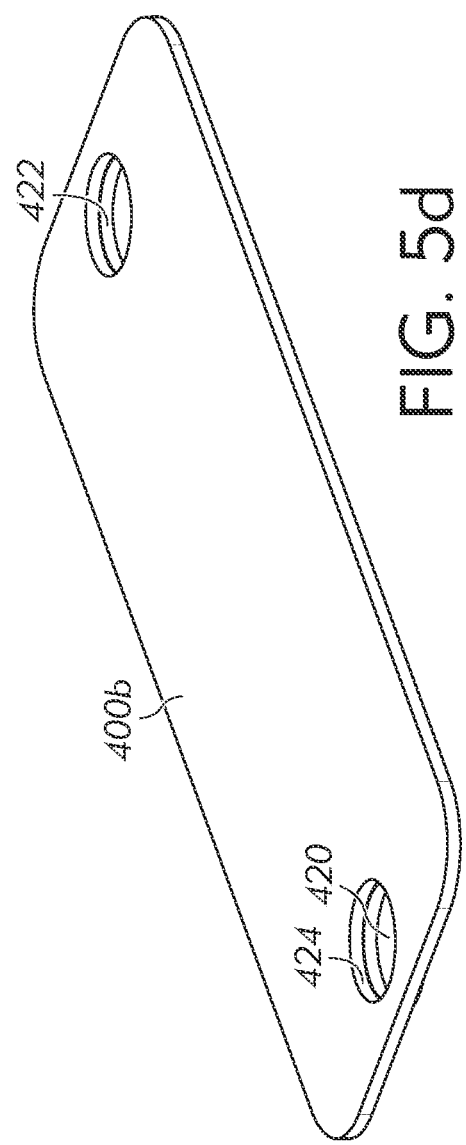

DEVICE AND METHODS FOR FREEZING LIQUIDS INTO A FLAT FORM

FIELD OF THE INVENTION

The present invention relates in general to the storage of liquid-containing food and beverages and, more particularly, to devices and methods for freezing liquid-containing food and beverages into a flat form.

BACKGROUND OF THE INVENTION

Freezing potable or edible liquids is a good way to preserve the liquids for an extended period of time. In many cases, using a resealable plastic zipper bag is a cheap and convenient storage medium for freezing liquids. However, plastic zipper bags do not keep their shape well when filled with a liquid. FIG. 1a shows a plastic zipper bag 10 filled with a liquid. Bag 10 has an irregular shape and, once frozen, will keep that shape until thawed. The irregular shape of bag 10 when frozen solid makes the bag inconvenient to store. Especially when several of the bags are being used, the bags in combination end up taking up a lot more space in the freezer than is necessary if, e.g., all of the liquid was frozen as one solid mass. Bag 10 also doesn't stack well and the bags tend to slide off of each other and quickly become disorganized.

Freezing liquid in a flat form can improve storage efficiency. FIG. 1b shows a plastic zipper bag 20 that was held flat while the liquid inside was frozen so that the frozen solid liquid is now stuck in a regular flat shape. Having a liquid-filled plastic bag frozen in a flat form improves storage efficiency because the bags can be neatly stacked or stored upright in a bin 30 as shown in FIG. 1c. The flat surfaces of the plastic bags 20 contact each other neatly without significant air gaps formed by irregular surface shapes.

Having frozen liquids in a flat form is convenient for storage, but keeping the liquid-filled bags flat while the liquid freezes into a solid is not easy or simple. Therefore, a need exists for improved methods and devices for freezing liquids into a flat form.

BRIEF DESCRIPTION OF THE DRAWINGS

FIGS. 2a-2i illustrate a device to hold a plastic bag in a flat form while freezing a liquid contained in the bag;
FIGS. 5a-5h illustrate a fourth embodiment.

DETAILED DESCRIPTION OF THE DRAWINGS

The present invention is described in one or more embodiments in the following description with reference to the Figures, in which like numerals represent the same or similar elements. While the invention is described in terms of the best mode for achieving the invention's objectives, it will be appreciated by those skilled in the art that it is intended to cover alternatives, modifications, and equivalents as may be included within the spirit and scope of the invention as defined by the appended claims and their equivalents as supported by the following disclosure and drawings.

FIGS. 2a-2i illustrate a device usable to hold a liquid in a plastic bag flat while the liquid is being frozen into a solid. The liquid being frozen is commonly freshly pumped breast milk. However, the devices described below can be utilized with any liquid, gel, or other freezable substance. The bag contents being frozen can include both liquid and solid components, e.g., soup can be frozen for long term storage. The bag contents may not be intended for consumption, e.g., water can be frozen to form ice packs. Even non-potable or inedible liquids may be frozen for long term preservation or storage.

Figure 1B:
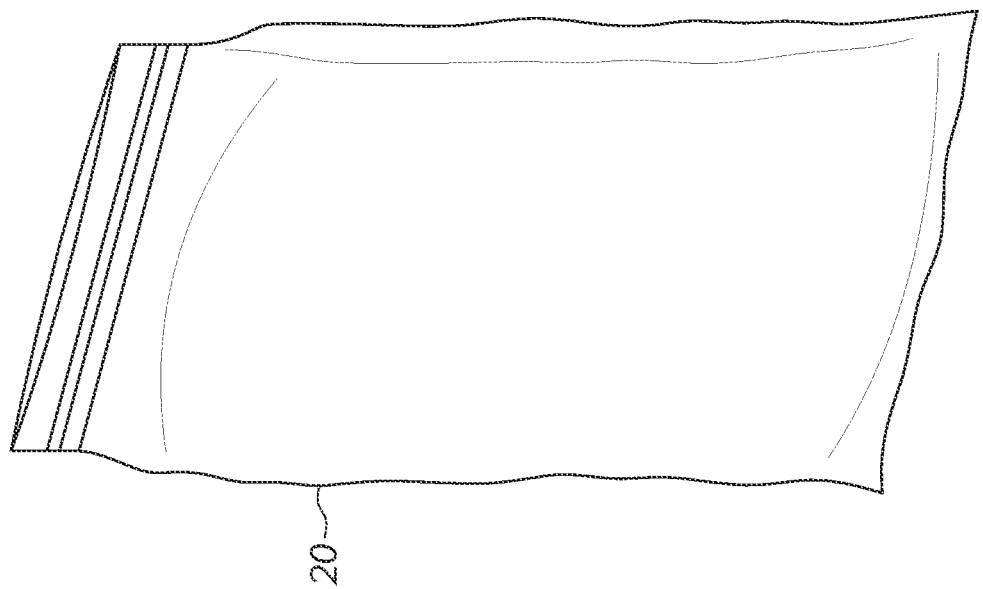
FIGS. 1a-1c illustrate freezing liquid in plastic bags for storage.
Figure 1A:
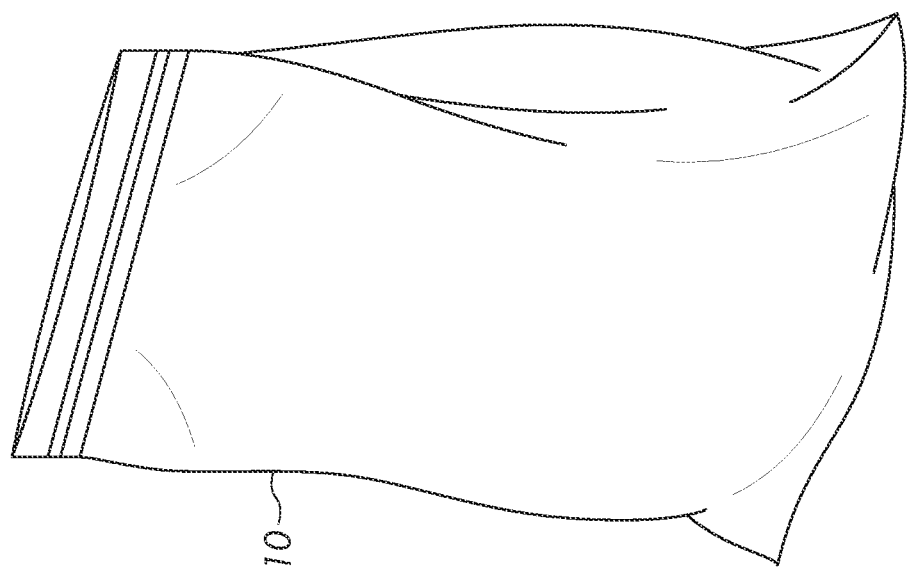
Figure 1C:
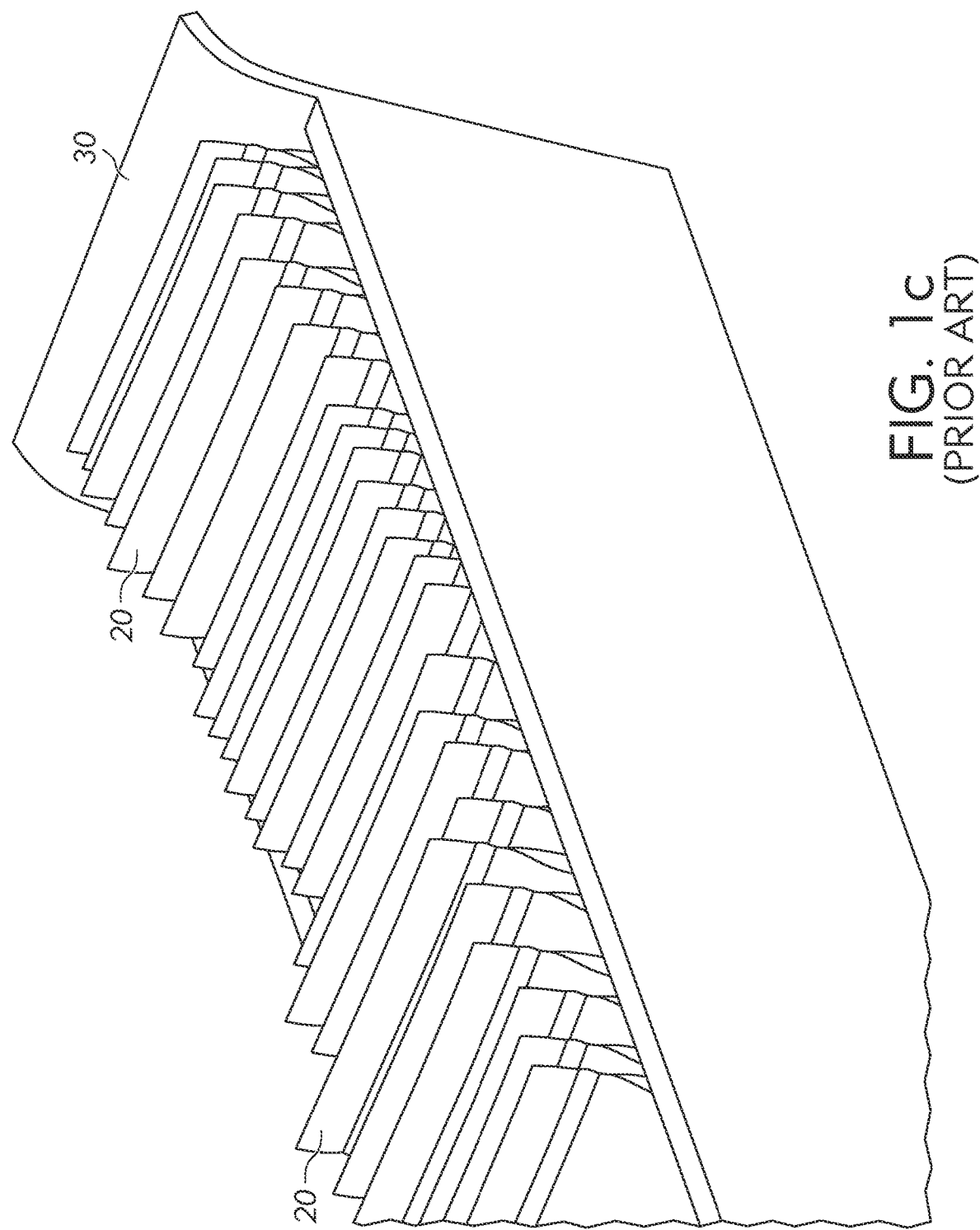
Figure 2A:
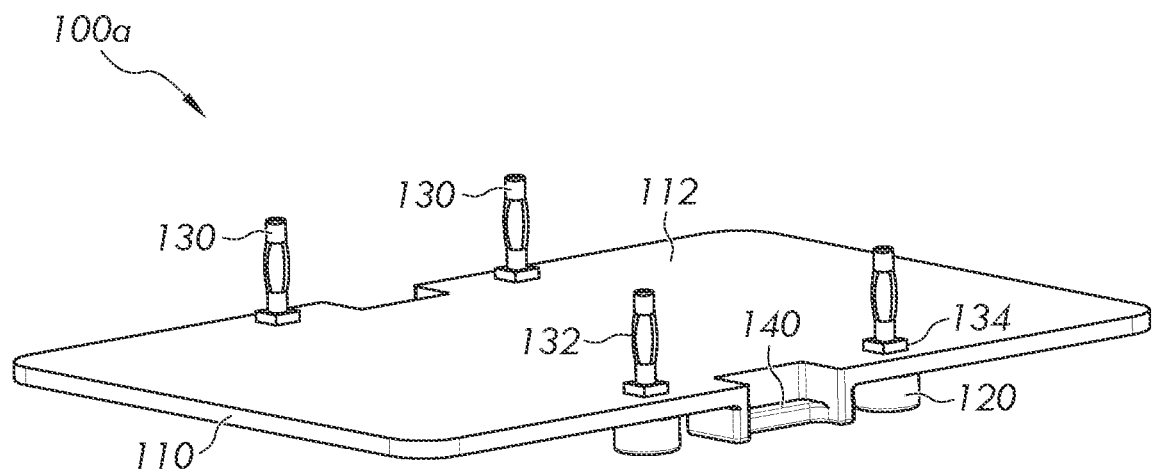
Figure 2B:
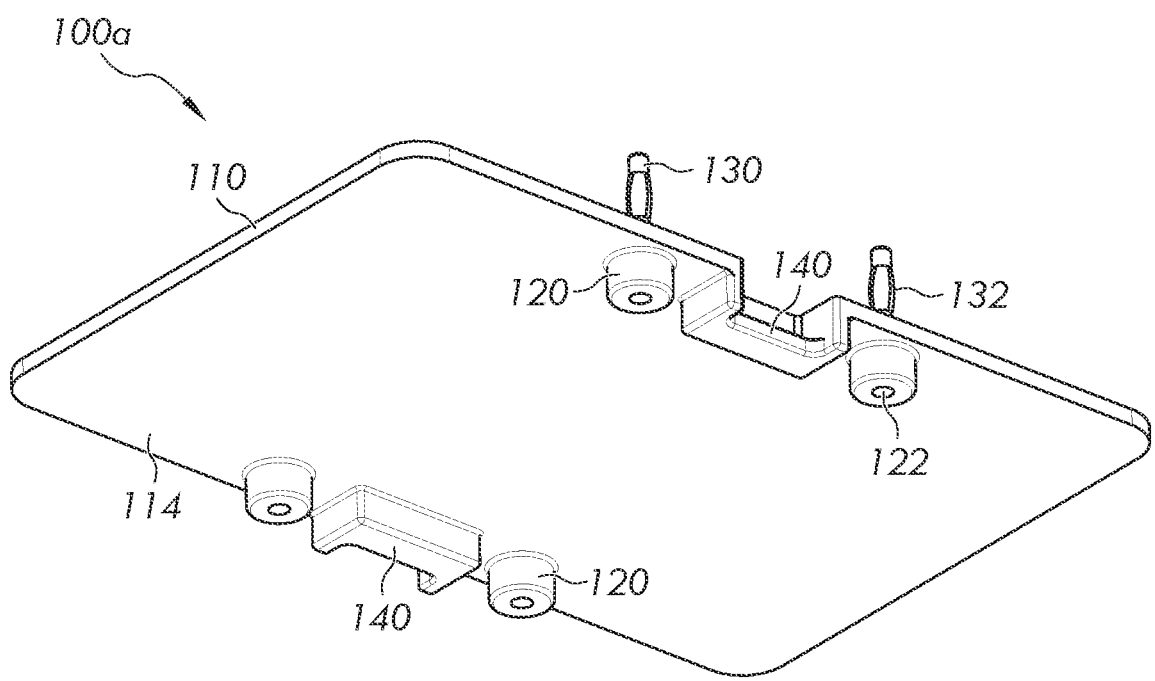
Figure 2C:
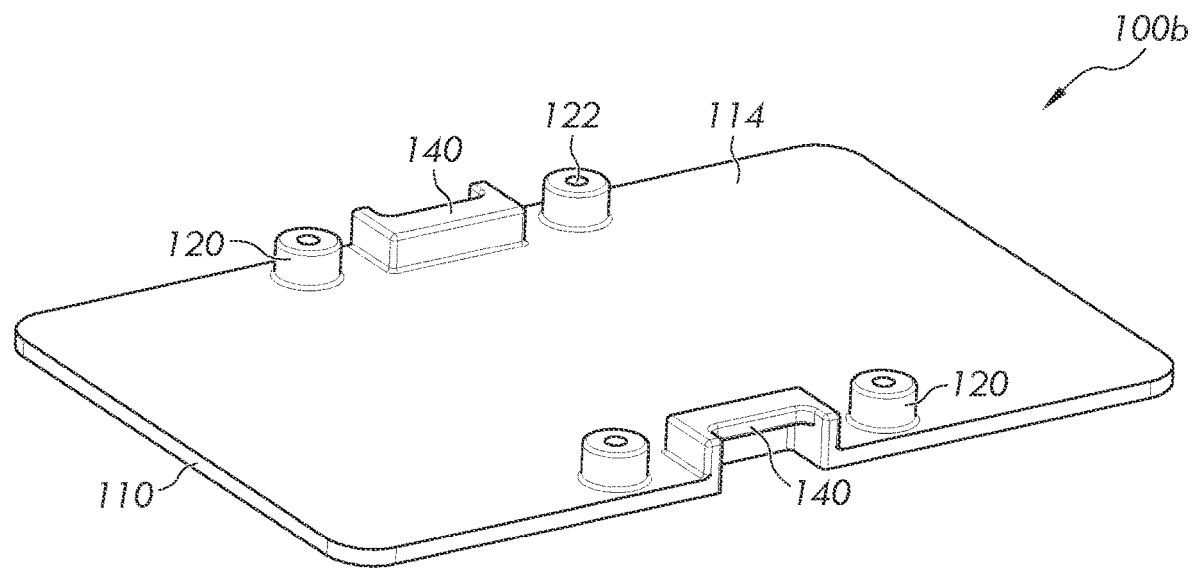
Figure 2D:
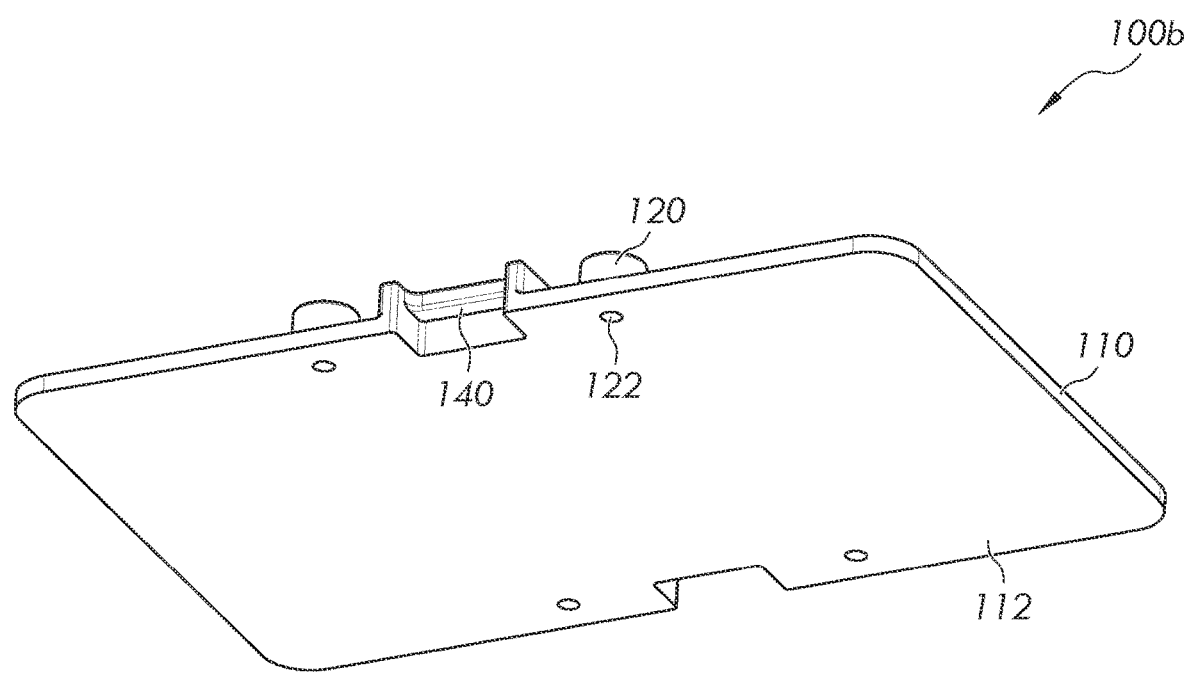

FIGS. 2a and 2b illustrate a bottom plate 100a of the device, while FIGS. 2c and 2d illustrate top plate 100b. Bottom plate and top plate are arbitrary names, and the device can be used with either plate on the top, or even with the plates positioned next to each other or in any other desired orientation. Bottom plate 100a and top plate 100b are injection molded from plastic with nearly identical shapes. In other embodiments, plates 100a and 100b are 3d-printed, machined, or formed using other methods. The material of plates 100a and 100b can be any suitable polymer or plastic, wood, metals such as aluminum or stainless steel, or any other suitable material.

Both plates 100a and 100b include a flat portion 110 that occupies most of the footprint of the plates. Flat portions 110 are rectangular with rounded corners, but any suitable shape can be used. Flat portions 110 include inner surfaces 112 and outer surfaces 114. In use, a plastic bag is pressed between the inner surfaces 112 of the plates 100a and 100b while being frozen to keep the liquid contained in the bag flat. Inner surfaces 112 are typically, but not necessarily, kept completely smooth and flat to create as flat of a surface to the frozen liquid as possible. Outer surfaces 114 will commonly have instructions, branding, or other information or designs molded into or printed on the outer surfaces.

Both plates 100a and 100b are formed with cylindrical interconnect structures 120 extending out above outer surfaces 114. Interconnect structures 120 are cylinders with openings 122 formed through the centers of the cylinders. Openings 122 and interconnect structures 120 are concentric cylinders with each other and extend perpendicularly to outer surface 114. Interconnect structures 120 extend over outer surfaces 114 so that the interconnect structures do not interfere with inner surfaces 112 of plates 100 squeezing against a liquid-filled bag. In other embodiments, interconnect structures 120 also extend at least partially in the opposite direction, over inner surfaces 112, to maintain an offset between plates 100a and 100b.

Bottom plate 100a has banana plugs 130, or another type of spring pin, disposed in openings 122 and extending vertically over inner surface 112. Banana plugs 130 are permanently molded into openings 122 in one embodiment. In other embodiments, banana plugs 130 are removably snapped or screwed into openings 122. FIG. 2e shows a detailed view of a banana plug 130. Banana plug 130 includes a compressible spring shaft 132 that extends over inner surface 112. Spring shaft 132 is sized such that the banana plug shaft fits within openings 122 of top plate 100b, although doing so requires the user to press the plates with enough force to compress the spring shaft inwards. The compression when spring shaft 132 of bottom plate 100a is inserted into openings 122 of top plate 100b applies pressure and helps hold the two plates together during the freezing process. The friction of banana plug 130 within opening 122 latches plate 100a to plate 100b.

Banana plugs 130 also include a hilt 134. Hilt 134 is a flat plate oriented parallel to inner surface 112. Hilt 134 presses against inner surface 112 when banana plug 130 is installed to help the banana plug be properly positioned by the user or factory manufacturing the bottom plate 100*a*. Threads 136 are formed on the bottom of banana plug 130. Threads 136 are helical to allow the banana plug to be screwed into and out of openings 122. In other embodiments, threads 130 are replaced by one or more flanges or another type of structure to keep banana plugs 130 held within openings 122 when the banana plug threads are molded into bottom plate 100*a*.

Four interconnect structures 120 with openings 122 are formed symmetrically near the middle of plates 100*a* and 100*b*. In other embodiments, interconnect structures 120 are formed in the corners of plates 100*a* and 100*b*. Some embodiments only use two interconnect structures 120 per plate, which could be centered along either the long or short edges of plates 100*a* and 100*b* or positioned in any other suitable locations. Any suitable number and positioning of interconnect structures 120 can be used. Forming interconnect structures 120 in symmetrical positions allows the same mold to be used for both plates 100*a* and 100*b*, while still having the interconnect structures align to each other when one of the plates is flipped.

Plates 100*a* and 100*b* are molded with finger grips 140 that extend vertically above outer surfaces 114. Finger grips 140 provide a hollow space between plates 100*a* and 100*b* when the plates are pressed together. Depending on the thickness of a bag disposed between plates 100*a* and 100*b*, which will define a distance between the plates, a user may have trouble getting a finger between the plates to separate them. Finger grips 140 ensure that at any separation distance, a user can get a finger between plates 100*a* and 100*b*. Finger grips 140 include three perpendicularly connected sidewalls and a top. Finger grips 140 open out away from plate 100. The top of finger grip 140 has a concave shape to be more ergonomic but could also align to the outer perimeter of flat portions 110.

Figure 2G:
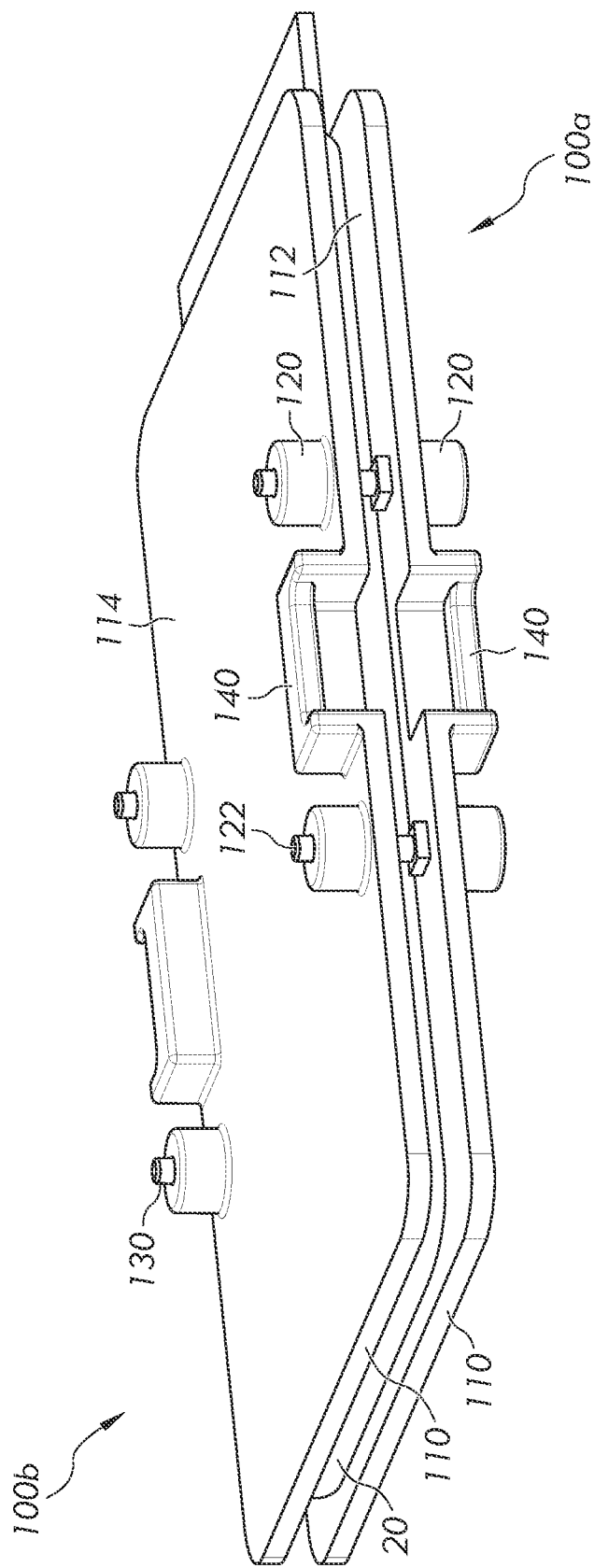

FIGS. 2*f* and 2*g* show usage of plates 100*a* and 100*b* to freeze a liquid into a flat form. In FIG. 2*f*, a bag 20 filled with a freezable liquid is disposed between plates 100*a* and 100*b*. One convenient strategy is to place bag 20 on bottom plate 100*a* first, and then clamp down top plate 100*b* onto the bottom plate over the bag. This ensures that bag 20 is completely within banana plugs 130 and won't interfere with the banana plugs being inserted into openings 122. Plates 100*a* and 100*b* are formed nearly identically, with interconnect structures 120 being located symmetrically. That way, when the plates are moved toward each other with inner surfaces 112 oriented toward each other, banana plugs 130 of bottom plate 100*a* are aligned with and are able to extend into openings 122 of top plate 100*b*.

FIG. 2*g* shows plates 100*a* and 100*b* clamped, snapped, pressed, or latched together with banana plugs 130 of bottom plate 100*a* inserted into openings 122 of top plates 100*b*. Each spring shaft 132 is compressed inward by being forced into an opening 122 and applies a force outward against interconnect structures 120 accordingly. The force being applied by banana plugs 130 keeps plates 100*a* and 100*b* attached to each other during the freezing process. Banana plugs 130 remain slidable in and out of openings 122, which allows plates 100*a* and 100*b* to separate slightly as the liquid freezes and expands without damaging the plates. The same mechanism allows the user to pull plates 100*a* and 100*b* apart relatively easily once the liquid in bag 20 has frozen. Finger grips 114 ensure that there is sufficient space between plates 100*a* and 100*b* for a user to insert a finger and get a sufficient grip to pull the plates apart.

Figure 2I:
Figure 2H:
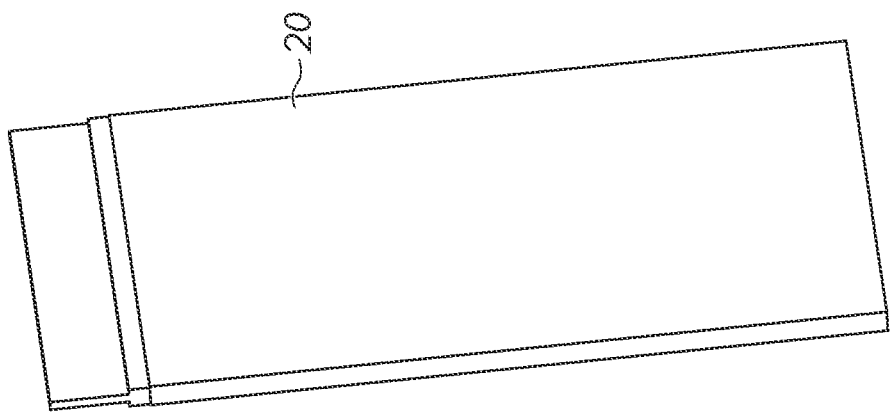

FIGS. 2*h* and 2*i* illustrate bag 20 after having been frozen. Bag 20 keeps its shape even though there are no more plates 100 supporting the bag's shape. The liquid is frozen solid and maintains its shape. The liquid can now be stored in a convenient manner that is easy to organize.

Figure 3A:
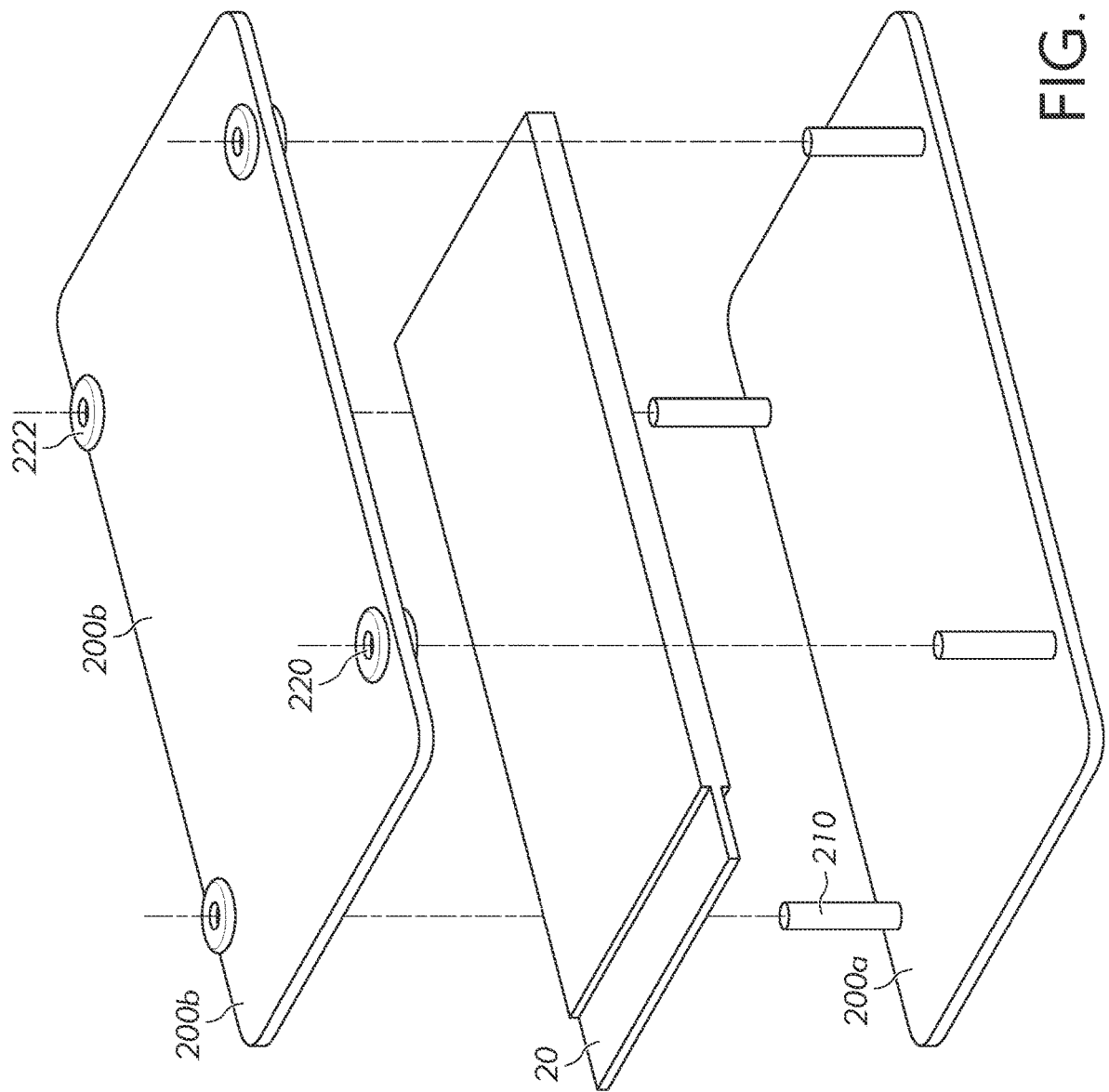
FIGS. 3a and 3b illustrate a second embodiment.
Figure 3B:
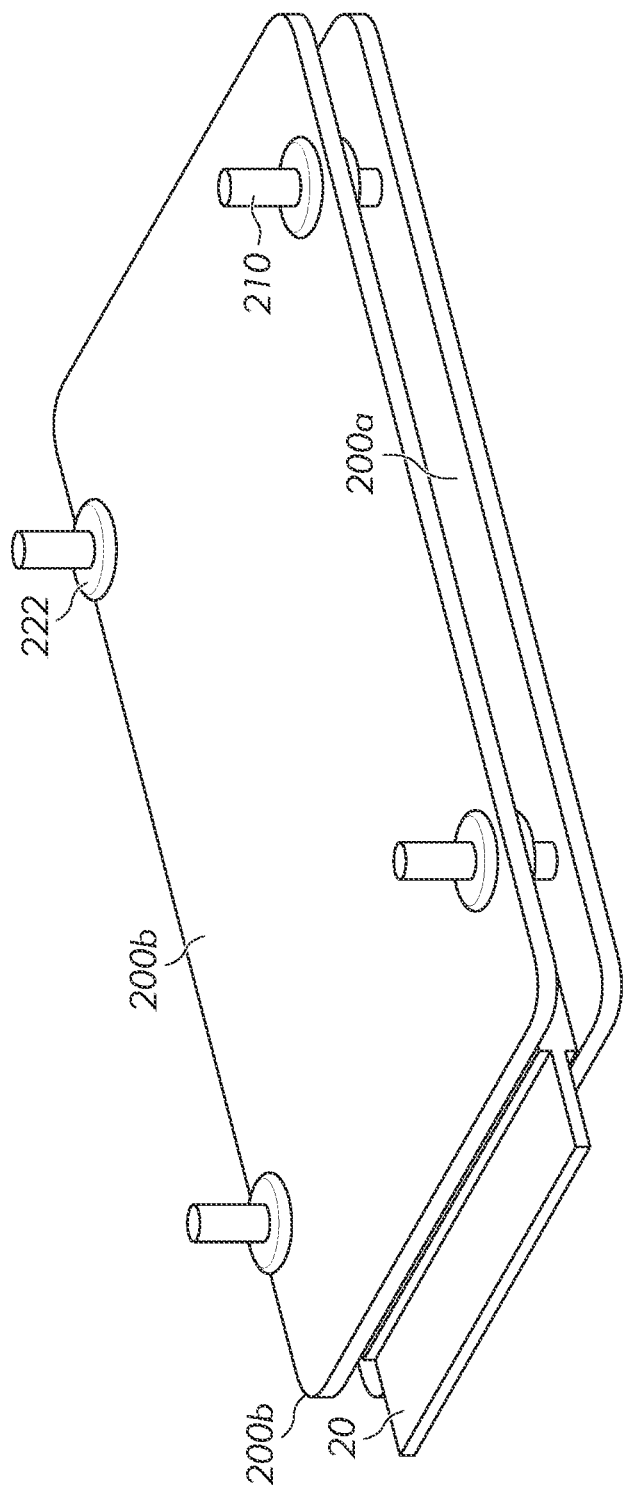

FIGS. 3*a* and 3*b* illustrate a similar embodiment with bottom plate 200*a* and top plate 200*b*. Instead of having banana plugs 130 that press outward against an opening, bottom plate 200*a* has fixed pegs 210 and top plate 200*b* has openings 220 with rubber gromets 222 that press inward to grip the fixed pegs. Bag 20 is inserted between bottom plate 200*a* and top plate 200*b* as shown in FIG. 3*a*, and then pegs 210 are pressed into openings 220 as shown in FIG. 3*b*. The rubber gromets 222 are compressed between the material of top plates 200*b* and pegs 210, creating friction to keep the plates attached to each other. Plates 200 are formed from any of the materials and using any of the methods discussed above for plates 100. In one embodiment, plates 200 are cut from sheet metal.

Pegs 210 and openings 220 are formed at symmetrical or the same positions on their respective plates so that they can be easily aligned to each other. Plates 200*a* and 200*b* have substantially the same shape as plates 100*a* and 100*b* and can be formed from similar materials and in similar manufacturing methods. Pegs 210 can be formed as part of plate 200*a* or formed separately and attached by welding, being molded with plate 200*a*, with a screw or bolt, using an adhesive, or using any other suitable method. Plates 200*a* and 200*b* can be formed with finger grips 140 as shown above.

Figure 4A:
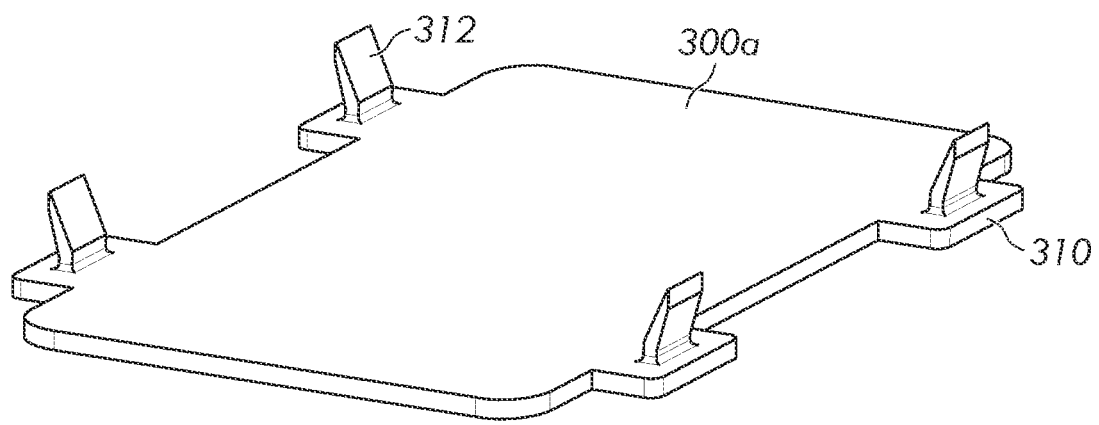
FIGS. 4a-4f illustrate a third embodiment.
Figure 4B:
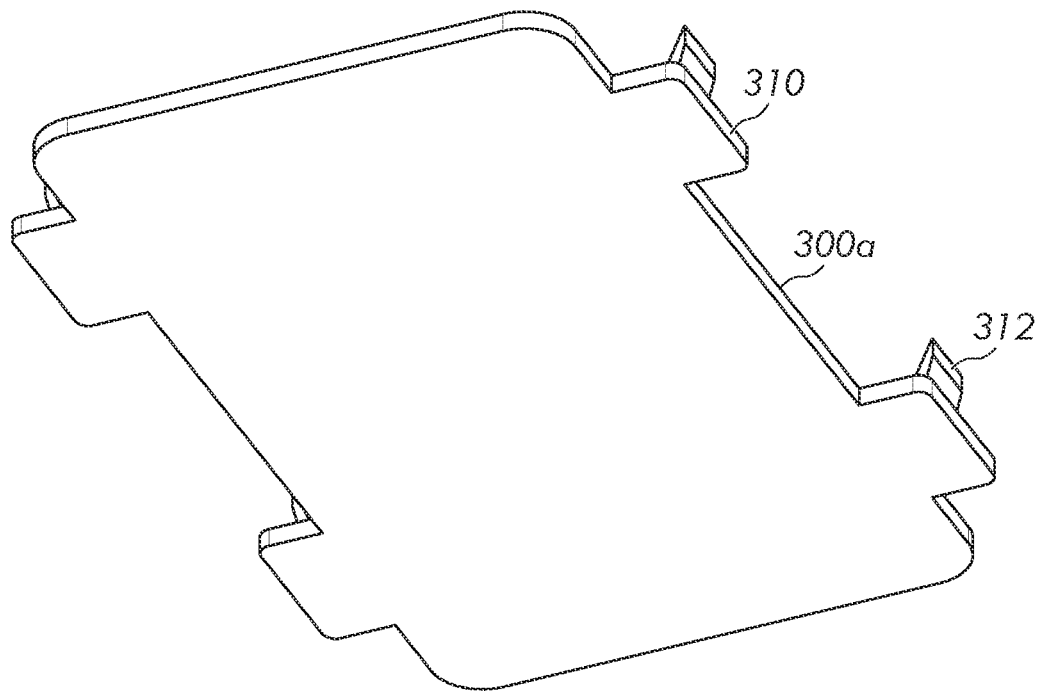
Figure 4C:
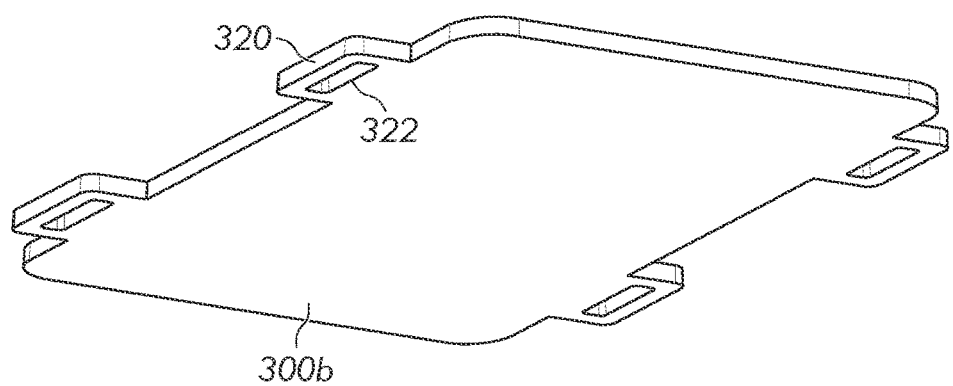

FIGS. 4*a*-4*f* illustrate a third embodiment with clips used to hold two plates 300*a* and 300*b* together. FIGS. 4*a* and 4*b* show bottom plate 300*a* and FIG. 4*c* shows top plate 300*b*. Plates 300 are formed of any of the materials discussed above for plates 100 and using any of the methods mentioned. In one embodiment, plates 300 are injection molded plastic. Finger grips 140 are added in some embodiments.

Bottom plate 300*a* has four tabs 310 extending outward from the plate, within the same plane, to allow clips 312 to rise vertically outside the main rectangle of the plates. Clips 312 extend upward and outward from tabs 310 so that a distance between two opposing clips at the top of the clips is greater than a distance between the same clips at their base. Top plate 300*b* has four tabs 320 that extend outward from the main body of the top plate in similar locations and with similar sizes to tabs 310 of bottom plate 300*a*. Tabs 310 have openings or slots 322 formed through the tabs.

The four slots 322 are configured to allow all four clips 312 to extend through the slots and thereby latch top plate 300*b* onto bottom plate 300*a*. Clips 312 slant outward and need to be pressed inward toward the main body of bottom plate 300*a* to fit all four clips through their respective slots 322. Once clips 312 are inserted through slots 322, the slanted outer surfaces of the clips press against surfaces within slots 322 to keep plates 300*a* and 300*b* latched together.

Figure 4D:
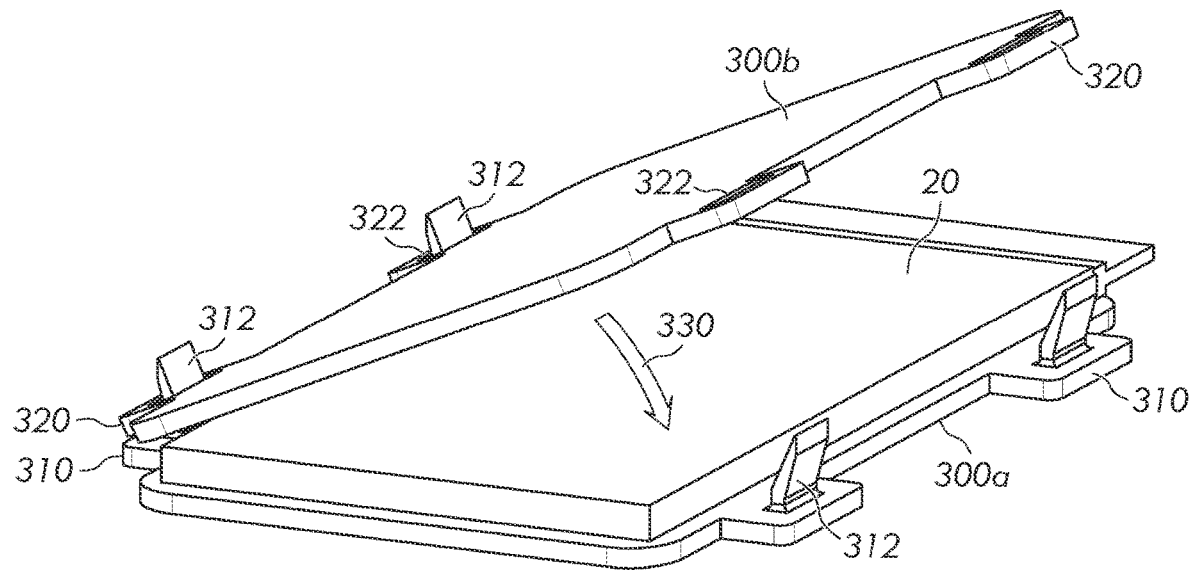

Inserting all four clips 312 through the four slots 322 at once can be difficult because the clips need to be pressed inward while aligning all four clips to all four opening at once. FIG. 4*d* illustrates one more convenient method of clipping top plate 300*b* to bottom plate 300*a*. First, two clips on one side of bottom plate 300*a* are inserted through two slots 322 on the same side of top plate 300*b*, which requires no bending of any clips 312 because the two clips on the same side of the plate or slanted in the same direction. Then, top plate 300*b* is rotated down as indicated by arrow 330 until the opposing clips 312 on the other side are physically touching their respective tabs 320. Only a small force is required by the user to slide the remaining two openings 322 laterally and over the two remaining clips 312 because clips 312 on the first side already being inserted through slots 322 keep the plates properly aligned through the process.

Figure 4E:
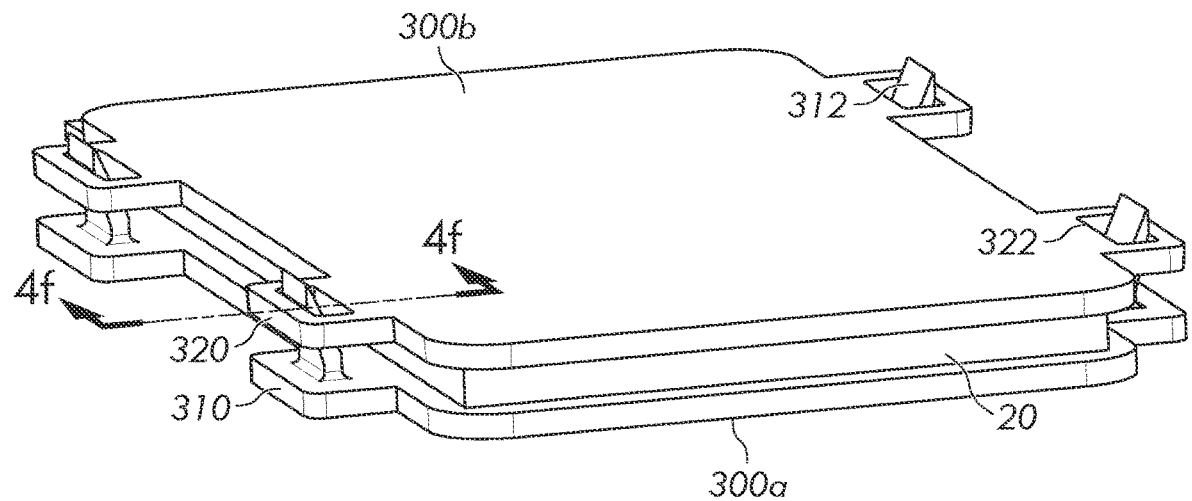
Figure 4F:
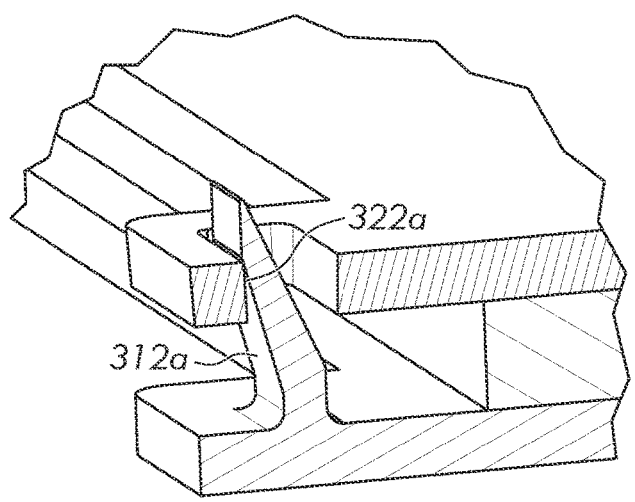

FIGS. 4e and 4f show clips 312 engaged with slots 322. A bag 20 is squeezed between plates 300a and 300b based on the force of clips 312 being applied against top plate 300b. FIG. 4f is a zoomed in cross-sectional view showing details of the sloped outer surface 312a of tab 312 pressing against surface 322a within opening 322. In some embodiments, inner surface 322a is beveled or sloped to make it easier to press clips 312 through slots 322. All four clips 312 can then be inserted partially into slots 322 without having to bend the clips, and then pressure from plates 300a and 300b being pressed together can stretch clips 312 inward as the clips slide along the sloped surfaces 322a.

Once the liquid within bag 20 is frozen, plates 300a and 300b are separated by pulling them apart. Clips 312 again bend inward as the sloped surface 312a slides against the inner surface of slots 322 and out of the slots. The frozen flat bag 20 can be conveniently stored.

Figure 5E:
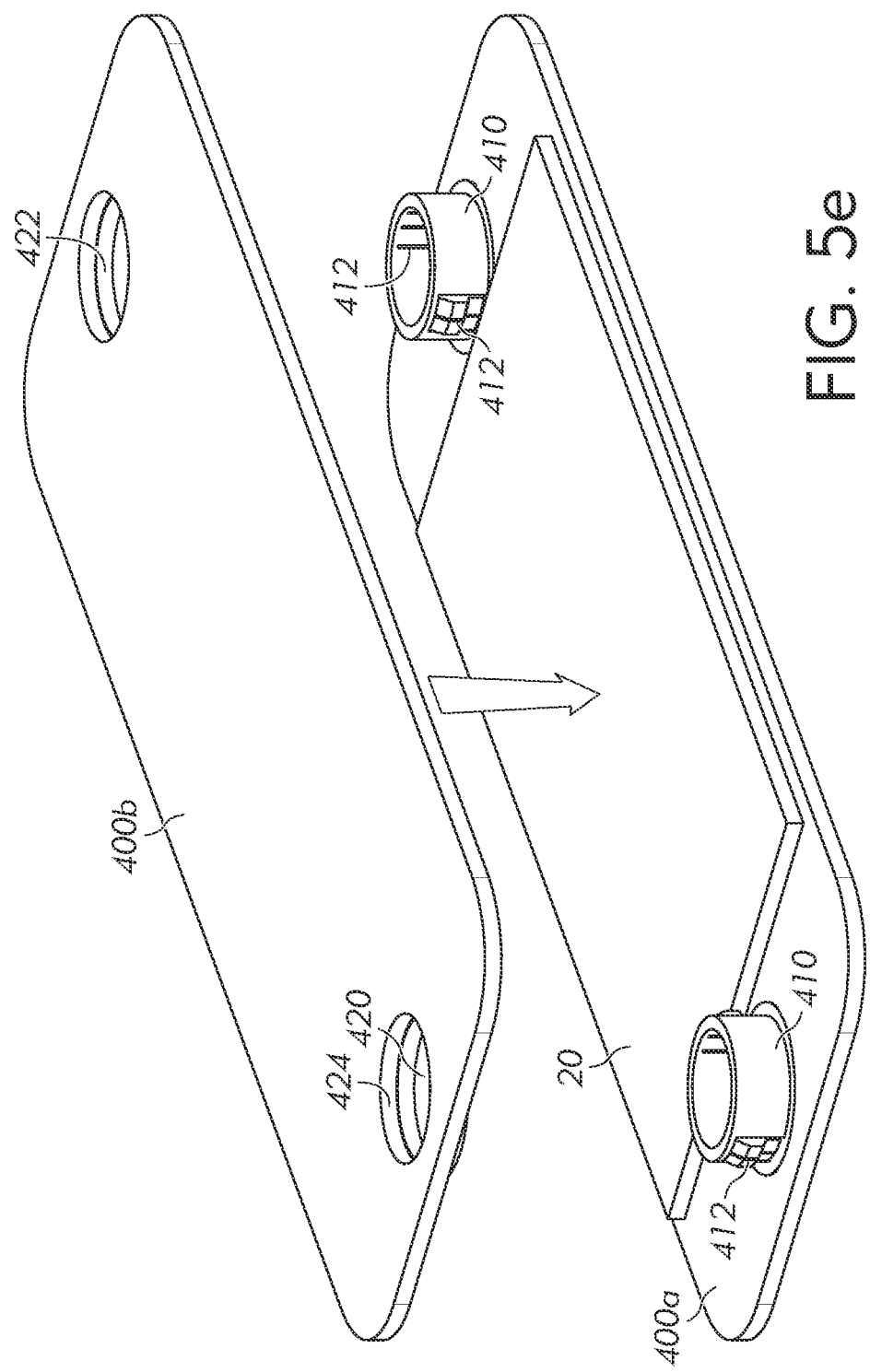

FIGS. 5a-5h illustrate another embodiment with a different style of clip. FIGS. 5a and 5b show bottom plate 400a. Bottom plate 400a has two interconnect structures 410, one at each end of the bottom plate. Interconnect structures 410 have a circular shape with clips 412 formed on two opposing sides of each interconnect structure. Clips 412 extend outward from the circular shape of interconnect structure 410 and are compressible inward such that the outer surfaces of clips 412 can be pressed to within the circle of the interconnect structure when fully compressed inward. Clips 412 spring back outward when the compression is released.

Figure 5F:
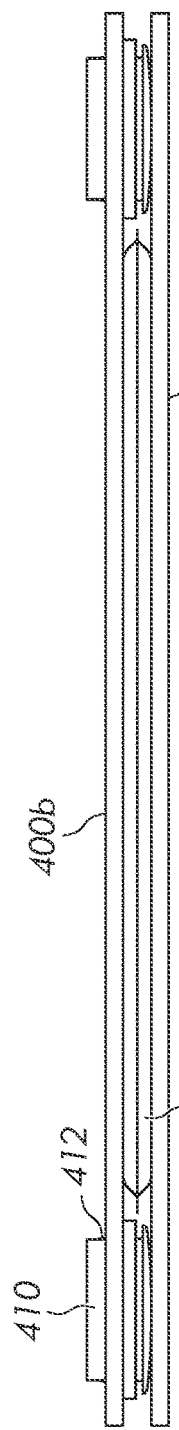

FIGS. 5c and 5d show top plates 400b. Top plate 400b has two openings 420 formed near the ends of the top plate in locations corresponding to interconnect structures 410 on bottom plate 400a. Openings 420 are positioned to be aligned to interconnect structures 410 when top plate 400b is placed over bottom plate 400a as shown in FIG. 5e. When plates 400 are moved together, interconnect structures 410 are inserted into openings 420 as shown in FIGS. 5f and 5g.

Openings 420 have a narrow portion 422 and a wider portion 424. Interconnect structures 410 are inserted with narrow portion 422 oriented toward bottom plate 400a. Narrow portion 422 has a diameter that is the same or slightly larger than a diameter of interconnect structures 410, but less than the distance between the outermost portions of clips 412 when the clips are not pressed in. Therefore, as plates 400 are pressed together around bag 20 filled with a freezable liquid, narrower portion 422 of opening 420 fits around interconnect structure 410 and presses clips 412 inwards.

Figure 5G:
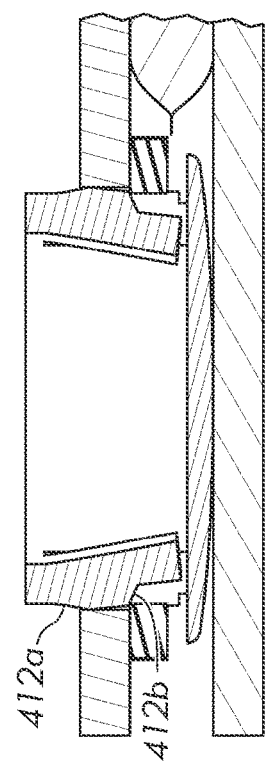

Clips 412 have sloped upper surfaces 412a, better illustrated in the zoomed-in cross-sectional view of FIG. 5g, that allow the surface of narrower portion 422 to slide down while pressing clips 412 inward gradually. Once plates 400a and 400b have been pressed together sufficiently far that the wider portion of clip 412 is completely through narrower portion 422 of opening 420, the clips expand outward into wider portion 424 of opening 420. Clips 412 are not able to completely expand back outward within opening 420, so a force is applied by the clips to the inside of the opening. The force being applied by clips 412 helps keep plates 400 together and keeps clips 412 from sliding back over narrower portion 422 of opening 420. The plates press against bag 20 to keep the liquid contained therein in a flat form.

Any pressure pulling plates 400 apart will have to be sufficient enough to overcome the spring force of clips 412. Clips 412 have a bottom sloped surface 412b that will press against narrower portion 422 of opening 420. Sloped surface 412b allows the narrower portion 422 to compress clips 412 inward when a user applies sufficient force to pull plates 400 apart.

Figure 5H:

Plates 400a and 400b are made of flexible plastic so that, as the liquid in bag 20 freezes and expands, the plates are able to expand outward while clips 412a remain engaged with openings 420. The flexible aspect of plates 400a and 400b also allows a thicker or over-filled bag 20 to be pressed between the plates. FIG. 5h illustrates a bag 20 with more liquid than in the bags illustrated above being frozen with plates 400. The plates 400 are able to flex outward to accommodate the thicker bag 20. Because interconnect structures 410 are formed near the ends of plates 400 along their longest dimension, plates 400 have more length to flex. In other embodiments, plates 400 are formed using any of the methods and materials discussed above for plates 100.

In each embodiment, two plates are used to keep a bag of liquid pressed between the plates in a flat form while the liquid freezes. The plates have a two-part latching mechanism, where one part of the latching mechanism is on one plate and a second part of the latching mechanism on the other plate. As the plates are moved together, the latching mechanism latches the two plates together. The latching mechanism can be a banana plug into an opening, a peg into a gromet, a slanted clip into a slot, a round clip into a round opening, or any other suitable latching mechanism. Any of the above embodiments can have their respective latching mechanism formed at the ends of their respective plates to allow the plates to flex.

While one or more embodiments of the present invention have been illustrated in detail, the skilled artisan will appreciate that modifications and adaptations to those embodiments may be made without departing from the scope of the present invention as set forth in the following claims. Those having ordinary skill in the art will recognize that the disclosed features can be used in different combinations than those specifically disclosed when the features are compatible with each other.

What is claimed is:

1. A method of freezing liquid in a flat form, comprising:
providing a first plate including,
a first surface, wherein the first surface is completely flat and extends to four outer edges of the first plate, and
a spring pin extending over the first surface;
providing a second plate including,
a second surface, wherein the second surface is completely flat and extends to four outer edges of the second plate, and
a cylindrical opening formed through the second plate;
disposing a bag containing a freezable liquid between the first plate and second plate with the first surface of the first plate and the second surface of the second plate oriented toward the bag; and
inserting the spring pin of the first plate into the cylindrical opening of the second plate to attach the first plate to the second plate with a bag containing freezable liquid squeezed between the first surface of the first plate and the second surface of the second plate, wherein the spring pin applies a force outward against a cylindrical inner surface of the cylindrical opening while remaining slidable in the cylindrical opening to allow a separation between the first plate and second plate to increase as the freezable liquid freezes and presses outwardly against the first plate and second plate.

2. The method of claim 1, wherein the protrusion includes a spring pin includes a banana plug.

3. The method of claim 1, further including placing the first plate, second plate, and bag into a freezer.

4. The method of claim 1, further including screwing the spring pin into the first plate.

5. A method of freezing a liquid in a flat form, comprising:
providing a first plate including a spring pin;
providing a second plate including a cylindrical opening; and
inserting the spring pin into the cylindrical opening to couple the first plate to the second plate, wherein the spring pin applies a force outward against a cylindrical inner surface of the cylindrical opening while remaining slidable in the cylindrical opening to allow a separation between the first plate and second plate to increase as the liquid freezes and presses outwardly against the first plate and second plate.

6. The method of claim 5, wherein the spring pin includes a banana plug.

7. The method of claim 5, further including molding the spring pin into the first plate.

8. The method of claim 5, further including screwing the spring pin into the first plate.

9. The method of claim 5, further including:
disposing a bag containing the liquid between the first plate and second plate; and
placing the first plate, second plate, and bag into a freezer.

10. The method of claim 9, wherein the first plate and second plate press against the bag to keep the liquid in a flat form.

11. The method of claim 5, wherein the first plate includes a plurality of symmetrically located spring pins and the second plate includes a plurality of symmetrically located cylindrical openings.

12. The method of claim 5, wherein:
the first plate includes a first surface that is completely flat for an entire footprint of the first surface;
the second plate includes a second surface that is completely flat for an entire footprint of the second surface; and
the liquid is squeezed between the first surface of the first plate and the second surface of the second plate.

13. A method of freezing liquid in a flat form, comprising:
providing a first plate including a spring pin;
providing a second plate including a cylindrical opening extending completely and continuously through the second plate; and
inserting the spring pin into the cylindrical opening to attach the first plate to the second plate.

14. The method of claim 13, wherein the spring pin includes a banana plug.

15. The method of claim 13, further including molding the spring pin into the first plate.

16. The method of claim 13, further including removably attaching the spring pin to the first plate.

17. The method of claim 13, wherein the first plate includes a plurality of symmetrically located spring pins.

18. The method of claim 13, wherein the spring pin applies a force outward against a cylindrical inner surface of the cylindrical opening while remaining slidable in the cylindrical opening.

19. The method of claim 13, wherein:
the first plate includes a first surface that is flat for an entire footprint of the first surface; and
the second plate includes a second surface that is flat for an entire footprint of the second surface.

20. The method of claim 19, further including:
disposing the liquid in a bag; and
squeezing the bag between the first surface and the second surface.

* * * * *